United States Patent
Ma et al.

(10) Patent No.: US 6,922,223 B2
(45) Date of Patent: Jul. 26, 2005

(54) VERTICAL ALIGNMENT MODE LIQUID CRYSTAL DISPLAY DEVICE HAVING PIXEL ELECTRODE ON PROTRUSION ON RESIN LAYER

(75) Inventors: Jung Ho Ma, Kyoungki-do (KR); Seung Ho Hong, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/603,050

(22) Filed: Jun. 24, 2003

(65) Prior Publication Data

US 2004/0070716 A1 Apr. 15, 2004

(30) Foreign Application Priority Data

Jun. 29, 2002 (KR) .................. 10-2002-0037595

(51) Int. Cl.⁷ ...................... G02F 1/1337; G02F 1/1343
(52) U.S. Cl. ...................... 349/129; 349/130; 349/138; 349/143; 349/146
(58) Field of Search .................. 349/129, 130, 349/138, 143, 146

(56) References Cited

U.S. PATENT DOCUMENTS

| | | | | |
|---|---|---|---|---|
| 6,147,722 A | * | 11/2000 | Shimada et al. | 349/43 |
| 6,342,935 B1 | * | 1/2002 | Jang et al. | 349/113 |
| 6,344,888 B2 | * | 2/2002 | Yasukawa | 349/113 |
| 6,466,296 B1 | * | 10/2002 | Yamada et al. | 349/160 |
| 6,512,561 B1 | * | 1/2003 | Terashita et al. | 349/118 |
| 6,567,144 B1 | * | 5/2003 | Kim et al. | 349/128 |
| 6,621,550 B1 | * | 9/2003 | Arakawa et al. | 349/178 |
| 2003/0043336 A1 | * | 3/2003 | Sasaki et al. | 349/187 |

* cited by examiner

Primary Examiner—Andrew Schechter
(74) Attorney, Agent, or Firm—Ladas & Parry LLP

(57) ABSTRACT

Disclosed herein is a vertical alignment liquid crystal display device with high-speed response. This vertical alignment liquid crystal display device comprises: upper and lower substrates which are disposed opposite one another at the desired interval; a liquid crystal layer sandwiched between the upper and lower substrates and formed of liquid crystals having negative dielectric anisotropy; a resin layer which is applied on the inner surface of the lower substrate so as to cover a thin film transistor, the resin layer having a centipede-shaped protrusion formed on the surface thereof; a pixel electrode which is formed on the protrusion while being disposed all over a pixel region; a counter electrode which is formed on the inner surface of the upper substrate; vertical alignment films which are interposed between the pixel electrode and the liquid crystal layer and between the counter electrode and the liquid crystal layer, respectively; and polarizers which are attached on the outer surfaces of the upper and lower substrates, respectively, in such a manner that their polarizing axes cross each other.

14 Claims, 4 Drawing Sheets

VERTICAL ALIGNMENT MODE LIQUID CRYSTAL DISPLAY DEVICE HAVING PIXEL ELECTRODE ON PROTRUSION ON RESIN LAYER

BACKGROUND OF THE INVENTION

1. Field of the Invention

The present invention relates to a liquid crystal display, and more particularly, to a vertical alignment mode liquid crystal display device with high-speed response.

2. Description of the Prior Art

As well known in the art, a vertical alignment mode liquid crystal display was proposed to improve the viewing angle and response speed properties of a twisted nematic mode liquid crystal display.

Although not shown in the accompanying figures, in this vertical alignment mode liquid crystal display, a liquid crystal layer formed of liquid crystals with negative dielectric anisotropy is sandwiched between upper and lower electrodes, each having a liquid crystal driving electrode. Also, vertical alignment films are disposed on the inner surfaces of the upper and lower substrates, respectively. And polarizers are attached to the outer surfaces of the upper and lower substrates, respectively, in such a manner that their polarizing axes cross each other.

However, in this vertical alignment mode liquid crystal display, the liquid crystals have refractive index anisotropy due to their rod-like shape, and for this reason, the screen image of the display varies depending on viewing angle. For example, before application of an electric field, all the liquid crystal molecules are aligned in a direction perpendicular to the substrates, and thus, on the front of the screen, complete darkness is achieved but on the side of the screen, light is leaked to cause deterioration in image quality.

Thus, in order to compensate for the deterioration of image quality caused by the refractive index anisotropy of the liquid crystal molecules, there was proposed a structure wherein the electric field is distorted to align the liquid crystal molecules in four directions, thereby improving the viewing angle.

For example, U.S. Pat. No. 6,288,762 discloses a structure in which protrusions serving to distort the electric field are formed on substrates. This structure is shown in FIG. 1.

As shown in FIG. 1, a lower substrate 11 and an upper substrate 12 are disposed opposite one another while interposing liquid crystal molecules 13 therebetween. Protrusions 14 are formed on the inner surface of each of the lower substrate 1 and the upper surface 12.

In this structure, an electric field is distorted around the protrusions 14 upon its application such that the liquid crystal molecules 13 are symmetrically aligned. As a result, there are formed a multi-domain of the liquid crystal molecules. This compensates for the deterioration of image quality caused by the refractive index anisotropy of the liquid crystal molecules.

In another attempt to distort the electric field, there was proposed a method in which a liquid crystal driving electrode with slits is used in place of the protrusions. The structure of the liquid crystal driving electrode is shown in FIG. 2, and the principal of operation of this structure equals to that of the protrusions. In FIG. 2, the reference numeral 20 designates the liquid crystal driving electrode having the slits.

However, in the vertical alignment mode liquid crystal display utilizing the protrusion or slit structure, the liquid crystal molecules start to be tilted in the protrusion or silt portions upon application of the electric field and then the remaining portion of the liquid crystal molecules are also tilted with the passage of time. Due to this phenomenon, if the interval between the protrusions or slits is too long, the response time of liquid crystal molecules will be lengthened.

Thus, in order to solve this problem, a jagged liquid crystal driving electrode was proposed by Fujitsu, Co., Japan, in SID 2001 Digest, page 1066. The structure of this proposed electrode is shown in FIG. 3 where the reference numeral 30 designates the jagged liquid crystal driving electrode. This structure is known as significantly improving the response speed of liquid crystals.

However, in the vertical alignment mode liquid crystal display utilizing the jagged liquid crystal driving electrode, the response speed of liquid crystals is improved, but at a portion free from the electrode, the electric field is not generated to cause a phenomenon where the orientation of the liquid crystal molecules is delayed. For this reason, there are problems in that the response time is delayed and also the deterioration of image quality occurs due to the generation of disclination lines.

FIG. 4 is a drawing showing simulation results on a section taken along the line IV—IV of FIG. 3. From FIG. 4, it can be found that an increase in initial transmittance is insufficient at the portion free from the electrode.

SUMMARY OF THE INVENTION

Accordingly, the present invention has been made to solve the above-mentioned problems occurring in the prior art, and an object of the present invention is to provide a vertical alignment mode liquid crystal display device having high speed response while allowing prevention of the deterioration of image quality caused by the generation of disclination lines.

To achieve the above object, the present invention provides a vertical alignment mode liquid crystal display device which comprises: upper and lower substrates which are disposed opposite one another at the desired interval; a liquid crystal layer sandwiched between the upper and lower substrates and formed of liquid crystals with negative dielectric anisotropy; a resin layer which is applied on the inner surface of the lower substrate so as to cover a thin film transistor, the resin layer having centipede-shaped protrusion formed on the surface thereof; a pixel electrode which is formed on the protrusion while being disposed all over a pixel region; a counter electrode which is formed on the inner surface of the upper electrode; vertical alignment films which are interposed between the pixel electrode and the liquid crystal layer and between the counter electrode and the liquid crystal layer, respectively; and polarizers which are attached on the outer surfaces of the upper and lower substrates, respectively, in such a manner that their polarizing axes cross each other.

Preferably, the centipede-shaped protrusion consists of a central portion having a width of 5 $\mu$m or less, and outer portions arranged at both sides of the central portion at intervals of 4–25 $\mu$m. Moreover, the pixel electrode is formed in such a manner that the interval between two adjacent pixel electrodes is less than 10 $\mu$m. Furthermore, the laminated structure of the protrusion and the pixel electrode formed thereon is formed into a clamp shape within a unit pixel, such that a multi-domain of the liquid crystals can be formed.

According to the present invention, the centipede-shaped protrusion is formed on the lower substrate, and then the pixel electrode is formed on the protrusion, so that fast response time of the liquid crystals can be ensured and thus the generation of disclination lines can be inhibited.

BRIEF DESCRIPTION OF THE DRAWING

The above and other objects, features and advantages of the present invention will be more apparent from the following detailed description taken in conjunction with the accompanying drawings, in which.

DETAILED DESCRIPTION OF PREFERRED EMBODIMENTS

Although not shown in the accompanying drawings, in a vertical alignment mode liquid crystal display according to the present invention, lower and upper substrates each having liquid crystal driving electrode made of indium tin oxide (ITO), i.e., a pixel electrode and a counter electrode, are assembled while a liquid crystal layer made of plural liquid crystal molecules having negative anisotropy is confined between the upper and lower substrates. Also, vertical alignment films are interposed between the lower substrate and the liquid crystal layer and between the upper substrate and the liquid crystal layer, respectively, and polarizers are attached on the respective outer surfaces of the substrates in such a manner that their polarizing axes cross each other.

In this vertical alignment mode liquid crystal display according to the present invention, the pixel electrode made of ITO has no slits, but is disposed all over a pixel region such that force can act on the liquid crystals throughout the largest possible area of the liquid crystal layer. Furthermore, a protrusion capable of serving as a slit is additionally disposed on the lower substrate.

Figure 5:
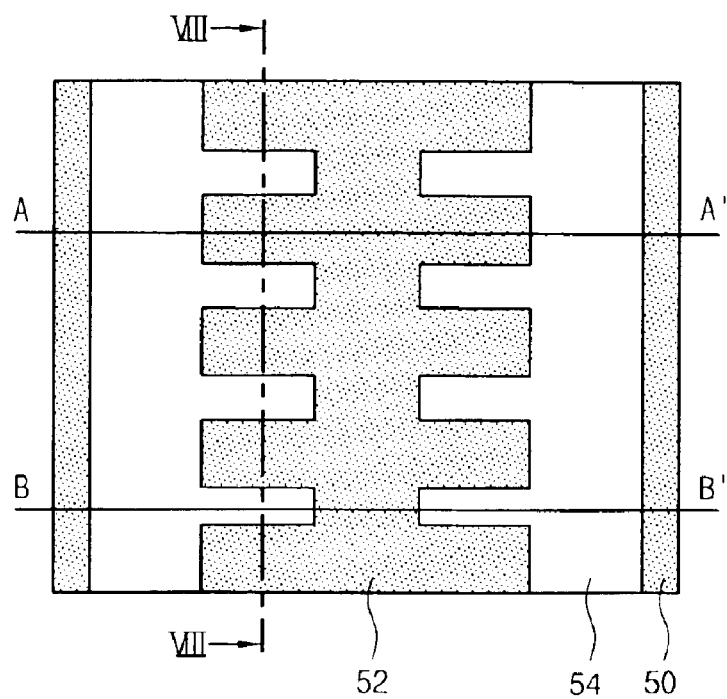
FIGS. 5 to 7 illustrate a vertical alignment mode liquid crystal display according to a preferred embodiment of the present invention.
Figure 6:
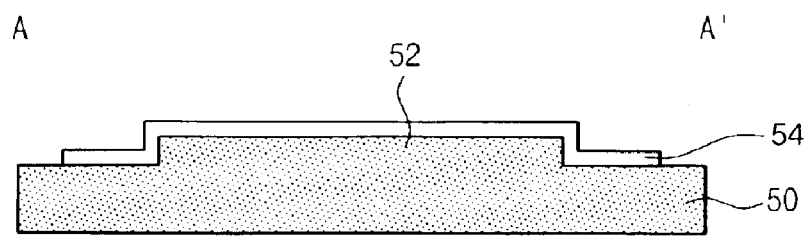
Figure 7:
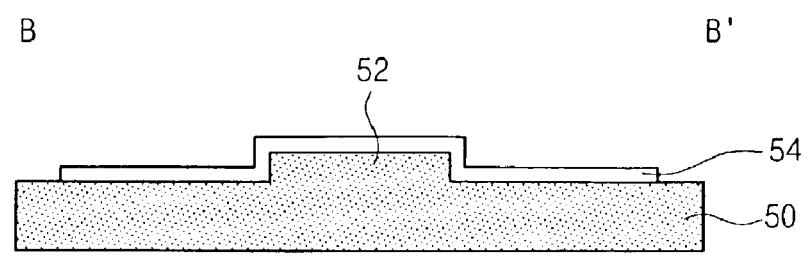

Specifically, FIGS. 5 to 7 are drawings illustrating a vertical alignment mode liquid crystal display according to the present invention. FIG. 5 is a top view showing an electrode structure in a lower substrate, FIG. 6 is a cross-sectional view taken along the line A–A' of FIG. 5, and FIG. 7 is a cross-sectional view taken along the line B–B' of FIG. 5.

As shown in FIGS. 5 to 7, the lower substrate in the vertical alignment mode liquid crystal display device according to the present invention has a protrusion 52 at a pixel region, and a liquid crystal driving electrode, i.e., pixel electrode 54 made of ITO, in the lower substrate, is formed on the protrusion 52.

In this case, the protrusion 52 is formed into a centipede-like shape, and the centipede-shaped protrusion 52 is formed by applying a resin layer 50 as a protective film on the lower substrate, and exposing the applied resin layer 50 to UV and then developing the exposed resin layer 50.

Furthermore, the pixel electrode 54 is formed by depositing ITO on the resin layer 50 including the protrusion, and then etching the ITO film. And a vertical alignment film is applied on the pixel electrode 54, thereby perfecting the lower substrate.

If the pixel region has the centipede-shaped protrusion while the pixel electrode is disposed all over the pixel region as described above, the formation of a multi-domain of the liquid crystals can be easily achieved so that the deterioration of image quality caused by the refractive index anisotropy of the liquid crystals can be compensated. In addition, force can act on the liquid crystal molecules throughout the pixel region so that it is possible to ensure the fast response time of the liquid crystals.

In particular, if a direction in which an electric field can be distorted is established using indented portions of the protrusion, and the electrode is formed in the same direction as the protrusion, the liquid crystals can be more smoothly controlled.

On the other hand, if the direction of the electrode is opposite to the direction in which the liquid crystal molecules are controlled, the disclination lines of the liquid crystal molecules are caused at a position where the two forces reach equilibrium. At this time, if the disclination lines are caused at the undesired position., transmittance are reduced and also the two forces act in an opposite direction so that they serve as a factor of preventing the moving of each of the two forces, thereby delaying the response time of the liquid crystals.

Thus, in forming the centipede-shaped protrusion according to the present invention, a central portion of the protrusion is formed to have a width of 5 $\mu$m or less, and outer portions arranged at both sides of the central portion are positioned at intervals of 4–25 $\mu$m. Also, in forming the pixel electrode made of ITO on the centipede-shaped protrusion, the interval between adjacent pixel electrodes is less than 10 $\mu$m.

According to the electrode structure according to the present invention, the response speed of the liquid crystals upon application of voltage to the liquid crystal driving electrode can be increased, and thus, initial transmittance can be increased. In addition, the generation of the disclination lines can be inhibited, so that the deterioration of image quality can be prevented.

Figure 1:
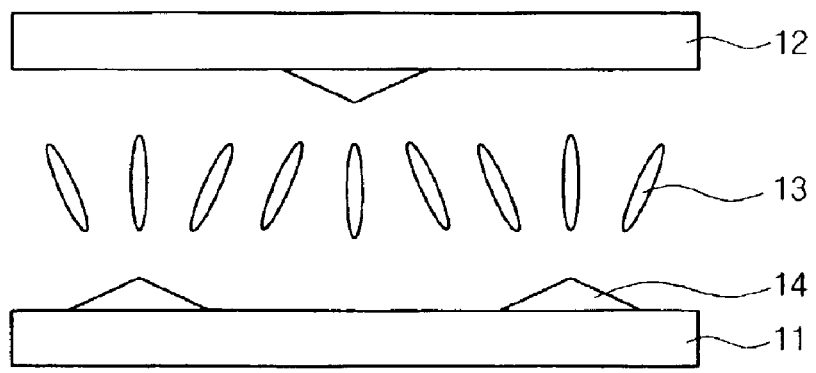
FIG. 1 is a drawing illustrating a vertical alignment mode liquid crystal display utilizing protrusions according to the prior art.
Figure 2:
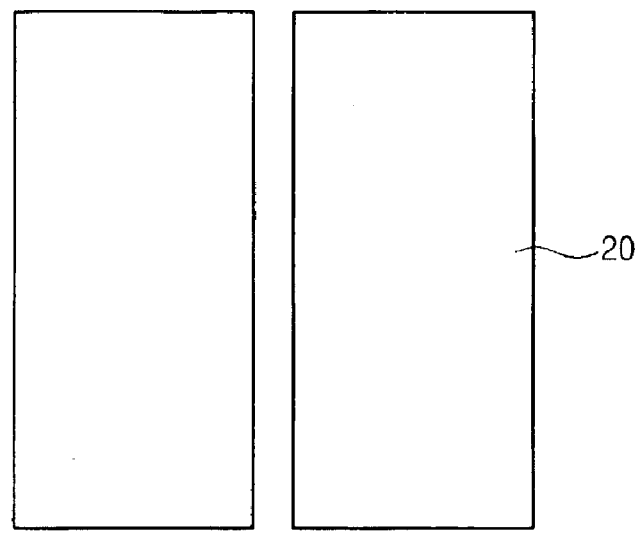
FIGS. 2 and 3 show the structure of a liquid crystal driving electrode used in a vertical alignment mode liquid crystal display according to the prior art.
Figure 3:
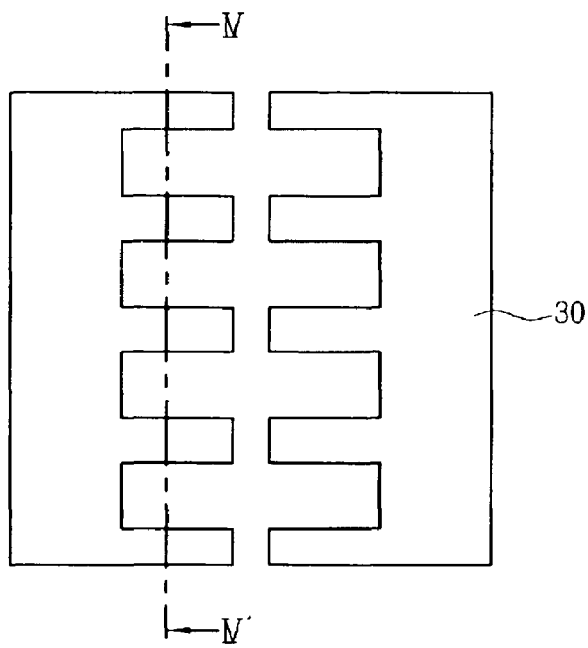
Figure 4:
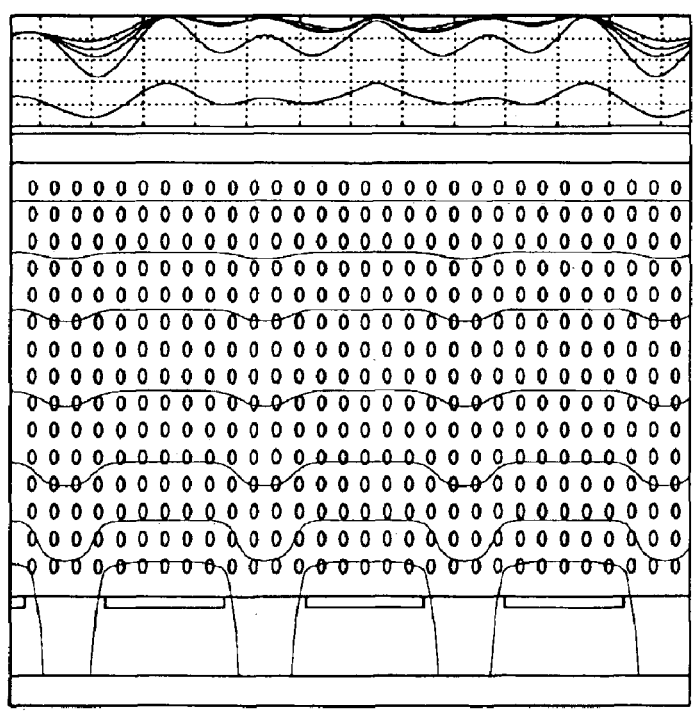
FIG. 4 is a drawing showing simulation results on a section taken along the line IV–IV' of FIG. 3.
Figure 8:
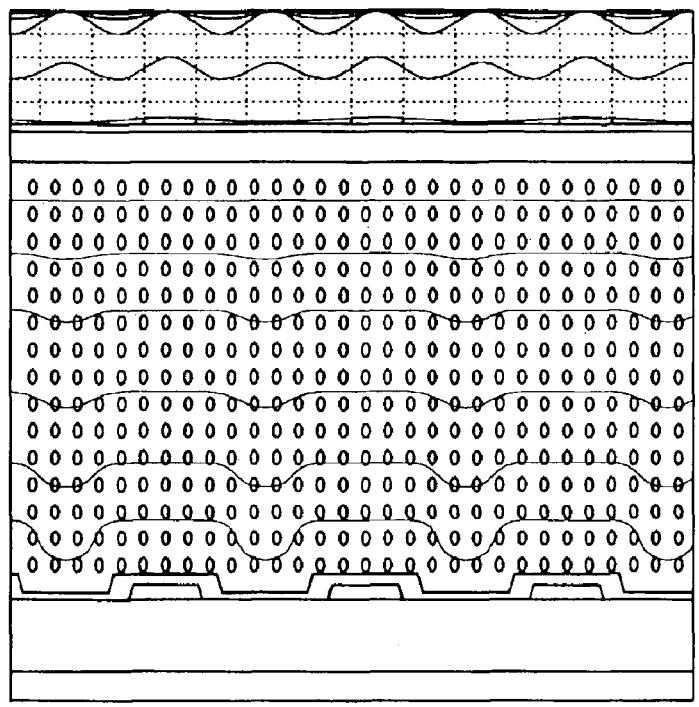
FIG. 8 is a drawing showing simulation results on a section taken along the line VIII–VIII' of FIG. 5.

FIG. 8 is a drawing showing simulation results on a section taken along the line VIII–VIII' of FIG. 5. From FIG. 8, it can be found that an increase in initial transmittance upon voltage application is high as compared to that of FIG. 4.

Meanwhile, in the vertical alignment mode liquid crystal display device according to the present invention, phase compensation plates may also be interposed between the polarizer and the lower substrate and between the upper substrate and the polarizer, respectively. The phase delay value (Rth) of these phase compensation plates for x, y and z directions is calculated from the following equation 1:

$$Rth = [(nx+ny)/2 - nz] \times d \qquad (1)$$

If monoaxial phase compensation plates are used, their phase delay value (Rth) is preferably in the range of 40–800 nm, and biaxial phase compensation plates are used, their phase delay value (Rth) is preferably in the range of 150–250 nm.

Moreover, the dielectric anisotropy of the liquid crystals is preferably in the range of –2 to –10, and the thickness of the liquid crystal layer is preferably in the range of 2–6 $\mu$m. The dielectric anisotropy of the liquid crystals times the thickness of the liquid crystal layer (d×$\Delta$n) is preferably in the range of 200–500 nm.

Figure 9:
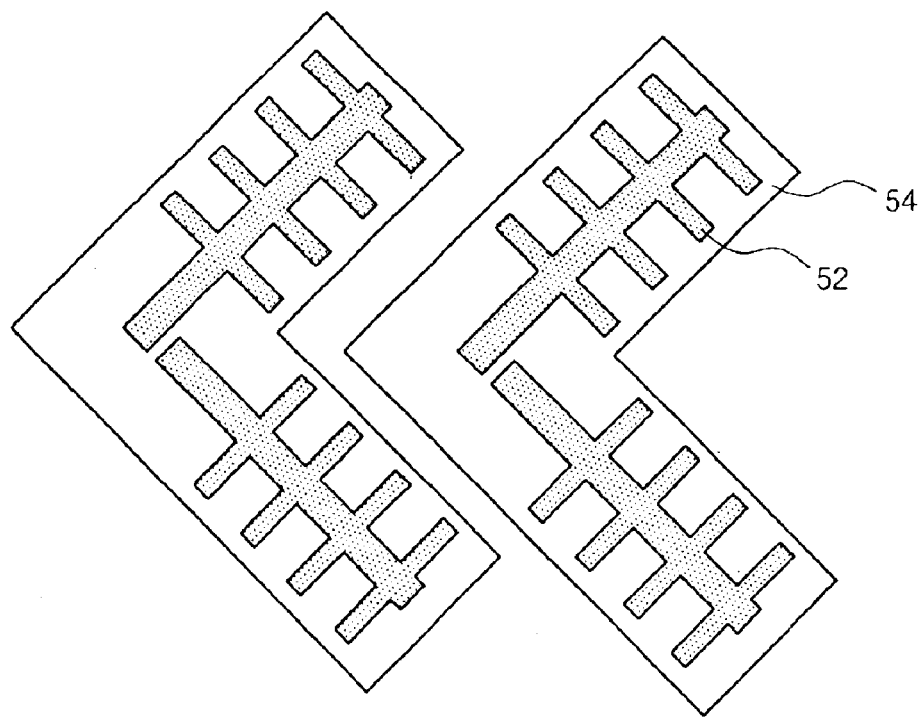
FIG. 9 is a drawing illustrating a vertical alignment mode liquid crystal display according to an alternative embodiment of the present invention.

FIG. 9 is a drawing illustrating a vertical alignment mode liquid crystal display device according to an alternative embodiment of the present invention.

In this embodiment, the protrusion 52 and the pixel electrode 54 made of ITO in the lower substrate can be formed into a clamp shape of a zigzag fashion.

In this case, a multi-domain of the liquid crystals can be formed so that the alignment of liquid crystals can be achieved in a more stable manner.

As described above, according to the present invention, the centipede-shaped protrusion is formed on the lower substrate while the liquid crystal driving electrode made of ITO is formed on the centipede-shaped protrusion. Thus, the response speed of the liquid crystals can be increased and also the generation of the disclination lines can be inhibited. As a result, according to the present invention, a vertical alignment mode liquid crystal display with high-speed response, wide viewing angle, high brightness and high image quality can be realized.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A vertical alignment mode liquid crystal display device which comprises:
   upper and lower substrates which are disposed opposite one another at the desired interval;
   a liquid crystal layer sandwiched between the upper and lower substrates and formed of liquid crystals having negative dielectric anisotropy;
   a resin layer which is applied on the Inner surface of the lower substrate so as to cover a thin film transistor, the resin layer having a protrusion formed on the surface thereof, wherein the protrusion has a middle section and at least 3 branch sections every branch section extending from the middle section perpendicularly;
   a pixel electrode which is formed on the protrusion while being disposed all over a pixel region;
   a counter electrode which is formed on the inner surface of the upper substrate;
   vertical alignment films which are interposed between the pixel electrode and the liquid crystal layer and between the counter electrode and the liquid crystal layer, respectively; and
   polarizers which are attached on the outer surfaces of the upper and lower substrate, respectively, In such a manner that their polarizing axes cross each other.

2. The vertical alignment mode liquid crystal display device of claim 1, wherein the protrusion consists of a central portion having a width of less than 5 μm, and outer portions which are arranged at both sides of the central portion at intervals of 4–25 μm.

3. The vertical alignment mode liquid crystal display device of claim 1, wherein the pixel electrode is formed in such a manner that the interval between two adjacent pixel electrodes is less than 10 μm.

4. The vertical alignment mode liquid crystal display device of claim 1, which further comprises phase compensation plates interposed between the upper substrate and the adjacent polarizer and between the lower substrate and the adjacent polarizer.

5. The vertical alignment mode liquid crystal display device of claim 4, wherein the phase compensation plates are monoaxial phase compensation plates or biaxial phase compensation plates, in which the monoaxial phase compensation plates have a phase delay value ranging from 40 to 800 nm, and the biaxial phase compensation plates have a phase delay value ranging from 150 to 250 nm.

6. The vertical alignment mode liquid crystal display device of claim 1, wherein the liquid crystals have a dielectric anisotropy of −2 to −10.

7. The vertical alignment mode liquid crystal display device of claim 1, wherein the liquid crystal layer has a thickness of 2–6 μm, and the thickness of the liquid crystal layer times the refractive index anisotropy of the liquid crystals is 200–500 nm.

8. The A vertical alignment mode liquid crystal display device comprising:
   upper and lower substrates which are disposed opposite one another at the desired interval;
   a liquid crystal layer sandwiched between the upper and lower substrates and formed of liquid crystals having negative dielectric anisotropy;
   a resin layer which is applied on the inner surface of the lower substrate so as to cover a thin film transistor, the resin layer having a centipede-shaped protrusion formed on the surface thereof wherein the laminated structure of the protrusion and the pixel electrode formed thereon is formed into a clamp shape within a unit pixel such that a multi-domain of liquid crystals can be formed;
   a pixel electrode which is formed on the protrusion while being disposed all over a pixel region;
   a counter electrode which is formed on the inner surface of the upper substrate;
   vertical alignment films which are interposed between the pixel electrode and the liquid crystal layer and between the counter electrode and the liquid crystal layer, respectively; and
   polarizers which are attached on the outer surfaces of the upper and lower substrate, respectively. In such a manner that their polarizing axes cross each other.

9. The vertical alignment mode liquid crystal display device of claim 8, wherein the centipede-shaped protrusion consists of a central portion having a width of less than 5 μm, and outer portions which are arranged at both sides of the central portion at intervals of 4–25 μm.

10. The vertical alignment mode liquid crystal display device of claim 8, wherein the pixel electrode is formed in such a manner that the interval between two adjacent pixel electrodes Is less than 10 μm.

11. The vertical alignment mode liquid crystal display device of claim 8, which further comprises phase compensation plates interposed between the upper substrate and the adjacent polarizer and between the lower substrate and the adjacent polarizer.

12. The vertical alignment mode liquid crystal display device of claim 11, wherein the phase compensation plates are monoaxial phase compensation plates or biaxial phase compensation plates, In which the monoaxial phase compensation plates have a phase delay value ranging from 40 to 800 nm, and the biaxial phase compensation plates have a phase delay value ranging from 150 to 250 nm.

13. The vertical alignment mode liquid crystal display device of claim 8, wherein the liquid crystals have a dielectric anisotropy of −2 to −10.

14. The vertical alignment mode liquid crystal display device of claim 8, wherein the liquid crystal layer has a thickness of 2–6 μm, and the thickness of the liquid crystal layer times the refractive Index anisotropy of the liquid crystals is 200–500 nm.

* * * * *